US006442180B1

(12) United States Patent
Gurrieri et al.

(10) Patent No.: US 6,442,180 B1
(45) Date of Patent: Aug. 27, 2002

(54) PORTABLE ELECTRO-OPTICAL DEVICE

(75) Inventors: Claudio Gurrieri, Bologna; Stefano Vassura, Rastignano Pianoro, both of (IT)

(73) Assignee: Datalogic S.p.A., Lippo di Calderara di Reno (IT)

( * ) Notice: Subject to any disclaimer, the term of this patent is extended or adjusted under 35 U.S.C. 154(b) by 0 days.

(21) Appl. No.: 09/362,988

(22) Filed: Jul. 30, 1999

(30) Foreign Application Priority Data

Oct. 15, 1998 (EP) .............................................. 98830611

(51) Int. Cl.[7] ................................................. H01S 3/10
(52) U.S. Cl. .......................................................... 372/9
(58) Field of Search ................................ 372/107, 108, 372/92, 98, 99, 9; 235/462

(56) References Cited

U.S. PATENT DOCUMENTS 5,198,651 A    3/1993    Barkan et al.
5,543,609 A    8/1996    Giordano et al.

*Primary Examiner*—Leon Scott, Jr.
(74) *Attorney, Agent, or Firm*—Nixon & Vanderhye P.C.

(57) ABSTRACT

A portable electro-optical device comprises an optical/electronic module (1), an external casing (25) designed to contain the module (1) and a supporting structure (10) arranged between the module (1) and the external casing (25); the supporting structure (10) is capable of ensuring that the module (1) is kept substantially protected from impact stresses which are due to accidental dropping during use of the device by an operator and act on the casing (25) in any direction. (FIG. 1)

24 Claims, 2 Drawing Sheets

PORTABLE ELECTRO-OPTICAL DEVICE

The present invention relates to a portable electro-optical device.

Portable electro-optical devices comprising an optical/electronic module and an external casing which contains the module are known. Devices of this type consist, for example, of laser guns for reading optical codes. In these devices the optical/electronic module comprises an optical unit and an electronic unit for controlling the optical unit and processing the signal. The optical unit contains a laser source which emits a laser beam and optical components for focusing and driving the laser beam. The optical components comprise movable mirrors which, depending on the technology used, are connected to a stepper motor or mounted on a resilient support. The electronic unit contains electronic components which are mounted on a printed circuit (or board) which also carries the optical components.

These devices, and in particular laser guns, are manually operated by operators and it happens that, during use, they are frequently dropped. The external casing of the devices is fairly strong and is able to withstand the impacts, but it transmits to the optical/electronic module, which is fairly delicate, stresses which often impair correct operation thereof. In fact, on account of the frequent impacts, displacements of the optical components occur, with consequent misalignment of the laser beam and also damage and breakage of the optical and electronic components.

Problems of an entirely similar nature are encountered in optical code readers which use an LED illumination system and sensors of the CCD (Charged Coupled Device) type or CMOS (Complementary Metal Oxide Semiconductor) type.

In an attempt to solve the problem, bearings made of visco-elastic material have been used, said bearings being arranged between the external casing and the board supporting the optical and electronic units. In particular, annular rubber bearings are generally used, being mounted on brackets fixed to the board and housed in seats formed in the casing.

However, this solution has proved to be unsatisfactory because, in various situations, twisting of the board has been found to occur, resulting in misalignment of the optical components and also detachment and/or breakage of optical or electronic components.

The inventors have realised that, in the above-mentioned conditions, these drawbacks are due to the fact that the rubber bearings are able to protect the optical and electronic components only in the case of stresses due to impact forces which are substantially perpendicular to their bases, namely parallel to the longitudinal axis of the bearings. On the other hand, they are often unable to withstand effectively stresses due to impact forces which are differently oriented, for example shearing forces, which are substantially parallel to the bases of the bearings, or inclined forces. In these circumstances, all the forces acting on the casing are transmitted to the board in a more or less direct manner and are concentrated in restricted zones of the board, causing the above-mentioned damage.

The object of the present invention is to eliminate the above-mentioned drawbacks.

SUMMARY OF THE INVENTION

The above-mentioned object is achieved, in accordance with the invention, by means of a portable electro-optical device comprising an optical/electronic module comprising an optical unit and an electronic unit and an external casing designed to contain said module, characterized in that it also comprises a supporting structure arranged between said module and said external casing, said structure being capable of ensuring that said module is kept substantially protected from impact stresses which are due to accidental dropping during use of said device by an operator and act in any direction on said casing.

In one embodiment, said supporting structure is of the controlled deformation type and is capable of dissipating energy resulting from said impact stresses.

In particular, said optical unit and said electronic unit are mounted on a board and said board is housed in said supporting structure.

Advantageously, said supporting structure comprises a frame which supports said board and is provided with pins for connection to said external casing.

Preferably, said board is provided with at least one hole and said frame is provided with at least one hollow stud designed to penetrate into said hole so as to be fixed to said board.

Moreover, said board is provided with at least one eyelet and said frame is provided with at least one element, preferably in the form of a tooth, designed to engage with said eyelet so as to retain said board in said frame in the longitudinal direction.

Preferably, said frame is provided with bearing lugs for said board and at least one resilient tongue designed to co-operate with at least one lug in order to retain vertically said board in said frame.

In another embodiment, visco-elastic elements are arranged between said support frame and said external casing.

Advantageously, said visco-elastic elements are rubber bearings.

In particular, said rubber bearings are ring-shaped and are mounted on said pins.

Preferably, said casing comprises a base and a cover, said base and cover being provided with respective half-seats designed to house said pins.

Advantageously, said half-seats are designed to house said bearings as well.

Preferably, said support frame is made of semi-rigid material. For example, it consists of a polymer material chosen from the group comprising: nylon, acetal resins, polycarbonates and the like.

According to a variant, said support frame is made of rigid material.

According to another variant, said support frame is made of substantially resilient material.

In particular, said optical unit comprises a laser source which emits a laser beam and optical components for focusing and driving said laser beam.

According to a variant, said optical unit comprises a diffused light source and a sensor of the CCD or CMOS type.

In the event of accidental dropping during use thereof by an operator, the electro-optical device according to the invention has the advantage that the optical/electronic module remains correctly positioned in the frame without damage to components and without the laser beam undergoing misalignment.

BRIEF DESCRIPTION OF THE DRAWINGS

Characteristic features and advantages of the invention will now be illustrated with reference to an embodiment provided by way of a non-limiting example in the accompanying drawings in which.

DETAILED DISCUSSION OF PREFERRED EMBODIMENTS

Figure 1:
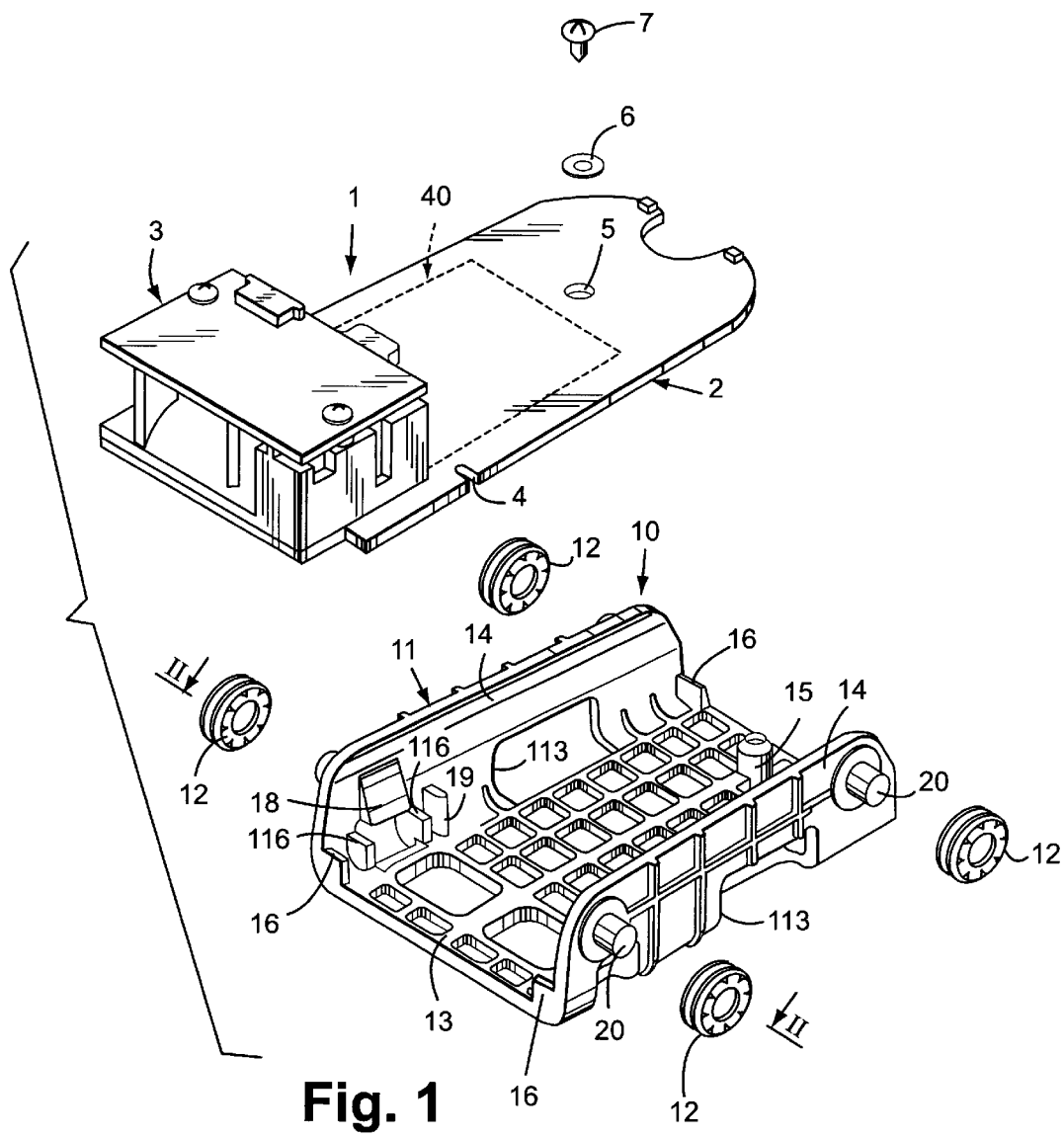
FIG. 1 is an exploded view of an optical/electronic module and a controlled-deformation supporting structure of an electro-optical device according to the invention.

FIG. 1 shows an optical/electronic module 1 and a supporting structure 10 of an electro-optical device. The electro-optical device consists, for example, of a laser gun for reading optical codes. The module 1 comprises an optical unit 3 and an electronic unit 40 (shown as a block in broken lines) mounted on a board 2. The optical unit 3 comprises a laser (diode) source which emits a laser beam and optical components for focusing and driving the laser beam, which in turn comprise a movable mirror (not shown). The optical unit could contain a light source of the LED type and sensors of the CCD and CMOS type. The electronic unit comprises electronic components and a printed circuit formed on the board 2 and connected to a cable by means of electrical connections (not shown), The board 2 has a hole 5 and two eyelets 4, only one of which can be seen in FIG. 1. The hole 5 is located close to one end of the board 2 and the eyelets 4 are spaced from the hole 5 and are located in the vicinity of the optical unit 3 on two longitudinal sides of the board 2.

FIG. 1 also shows a washer 6 and a screw 7, the function of which will be illustrated further below.

The supporting structure 10 comprises a support frame 11 and four ring-shaped bearings 12.

Figure 2:
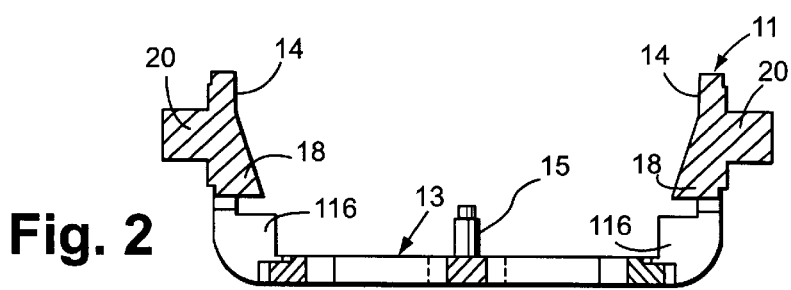
FIG. 2 is a cross-sectional view, on a larger scale, along the plane indicated by II—II in FIG. 1.

The frame 11 is formed in the manner of a shell and has a bottom wall 13 and side walls 14. The wall 13 is provided with a hollow stud 15 designed to penetrate into the hole 5 of the board 2. By means of the stud 15, the washer 6 and the screw 7, the board 2 is fixed to the frame 11. Lugs 16 and 116, on which the board 2 rests, are provided at the corners between the wall 13 and the walls 14. The walls 14 are provided with resilient tongues 18 (FIG. 2) designed to co-operate with pairs of underlying lugs 116 situated in the vicinity of the optical unit 3, in order to retain the board 2 in the frame 11 in the vertical direction. The walls 14 are also provided with teeth 19, only one of which can be seen in FIG. 1 and which are inserted into the eyelets 4 of the board 2 so as to retain the board in the frame 11 in the longitudinal direction. Each wall 14 is further provided with a pair of pins 20 for supporting the ring bearings 12. The bearings 12 could have other shapes: oval, rectangular, etc.

The frame 11 is provided with openings 113 which allow the cable with the electrical connections of the printed circuit to pass through.

The frame 11 is made, for example, of a controlled-deformation material, such as a semi-rigid material, in particular a polymeric material chosen from the group comprising: nylon, acetal resins, polycarbonates and the like. These materials represent the best compromise between elasticity, rigidity and strength.

The ring bearings 12 are made of visco-elastic material, for example rubber.

The frame 11 may be made of a rigid material, such as a metallic material, or a substantially resilient material. In these latter cases, the bearings 12 are made of a material such as to provide the structure 10 with the desired characteristics of capacity for absorption and dissipation of the impact energy.

The optical/electronic module 1 is mounted in the frame 11, by splaying the side walls 14 and positioning the board 2 on the lugs 16 so that the stud 15 enters into the hole 5 and the teeth 19 engage inside the eyelets 4. When the walls 14 are released, the board 2 is retained between the tongues 18 and the pairs of underlying lugs 116. Then, by simply screwing the screw 7 into the stud 15 with the arrangement of the washer 6 in between, the board 2 is firmly fixed to the frame 11. Finally, the ring bearings 12 are mounted on the pins 20.

The type of connection provided between the board 2 and the frame 11 by means of the eyelets 4 and the teeth 19, the lugs 16 and 116 and the tongues 18, allow relative movements of the board and the frame and prevent the deformations of the frame from being transmitted to the board.

Figure 3:
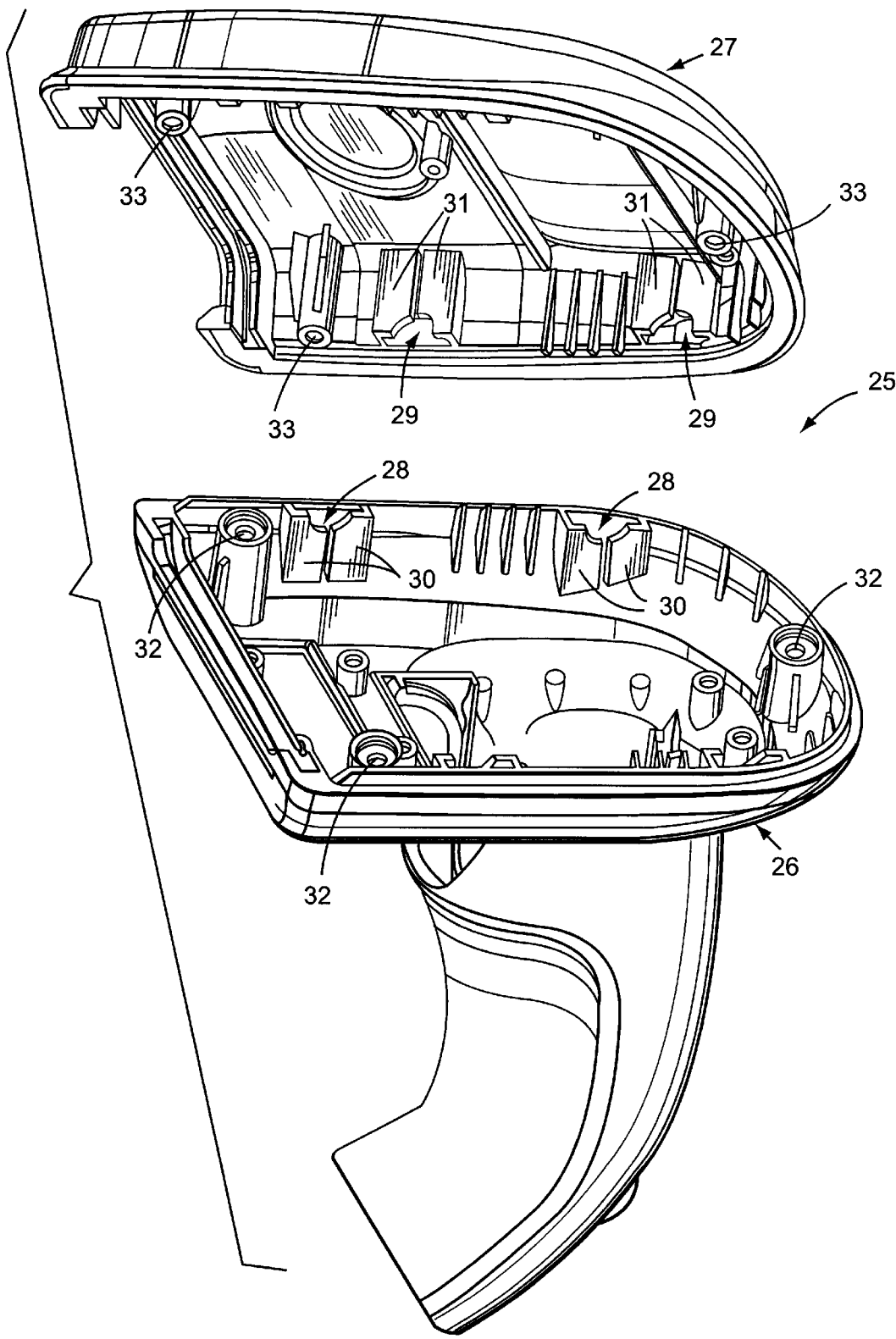
FIG. 3 is an exploded view of a casing containing the module and the structure according to FIG. 1.

FIG. 3 shows a casing 25 in the form of a gun, which is designed to contain the group formed by the supporting structure 10 and the optical/electronic module 1. The casing may have a banana shape or other shape. The casing 25 comprises a base 26 and a cover 27 provided, respectively, with four half-seats 28 and four half-seats 29 for the pins 20 and the bearings 12. The half-seats 28 and 29 are formed by means of interstices delimited by wall portions 30 and 31 with semi-circular edges. The base 26 has three through-holes 32 and the cover 27 has three blind holes 33. The holes 32 receive inside them screws, not shown, which are screwed into the holes 33 in order to fix the cover 27 to the base 26.

In order to assemble the laser gun, the group formed by the structure 10 and the module 1 is mounted inside the cover 27 so that the ring bearings 12 are housed in the half-seats 29. Then the cover 27 is positioned on the base 26 so as to house the bearings 12 in the half-seats 28 and finally the cover 27 is screwed to the base 26.

According to a variant, the support frame and the bearings may be moulded together and form a single body.

According to another variant, the external casing and the support frame may be moulded together and connected by means of resilient bridge-pieces.

What is claimed is:

1. A portable electro-optical device comprising:
    a module comprising an optical unit and an electronic unit;
    an external casing containing said module; and
    a support frame supporting said module and connected to said external casing, said frame moveably connected to said module and protecting said module, by permitting relative movement between said module and said frame, from impact stresses.

2. The portable electro-optical device according to claim 1, wherein said frame is a controlled-deformation frame for dissipating energy resulting from said impact stresses.

3. The portable electro-optical device according to claim 1, wherein said optical unit and said electronic unit are mounted on a board, said board being housed in said frame.

4. The portable electro-optical device according to claim 3, wherein said frame supports said board and is provided with pins for connection to said external casing.

5. The portable electro-optical device according to claim 4, wherein said board is provided with at least one hole and said frame is provided with at least one hollow stud cooperating with said hole so as to fix a portion of said board to said frame.

6. The portable electro-optical device according to claim 4, wherein said board is provided with at least one eyelet and said frame is provided with at least one tooth cooperating with said eyelet so as to retain said board in said frame in a longitudinal direction.

7. The portable electro-optical device according to claim 4, Wherein said frame is provided with bearing lugs for said board and at least one resilient tongue cooperating with at least one lug in order to retain vertically said board in said frame.

8. The portable electro-optical device according to claim 4, wherein visco-elastic elements are interposed between said support frame and said external casing.

9. The portable electro-optical device according to claim 8, wherein said visco-elastic elements are rubber bearings.

10. The portable electro-optical device according to claim 9, wherein said rubber bearings are ring-shaped and are mounted on said pins.

11. The portable electro-optical device according to claims 9, wherein said casing comprises a base and a cover, said base and cover provided with half-seats housing said bearings.

12. The portable electro-optical device according to claim 4, wherein said support frame is comprised of a semi-rigid material.

13. The portable electro-optical device according to claim 12, wherein said material is plastic and is chosen from the group consisting of: nylon, acetal resins and polycarbonates.

14. The portable electro-optical device according to claim 4, wherein said support frame is comprised of a rigid material.

15. The portable electro-optical device according to claim 4, wherein said support frame is comprised of a substantially resilient material.

16. The portable electro-optical device according to claim 1, wherein said casing comprises a base and a cover, said base and cover being provided with respective half-seats housing pins for connecting said frame to said external casing.

17. The portable electro-optical device according to claim 1, wherein said optical unit comprises a laser source which emits a laser beam and optical components for focusing and directing said laser beam.

18. The portable electro-optical device according to claim 1, wherein said optical unit comprises a diffused light source and a sensor, said sensor chosen from the group consisting of: a CCD and a CMOS sensor.

19. A resilient mount for locating a portable electro-optical device, including an optical unit and an electronic unit, in an external casing for containing said device, said external casing including at least one seat, said resilient mount comprising:

a board upon which said units of said device are mounted, said board having ends separated by a longitudinal direction and two sides separated by a transverse direction, said board including at least one eyelet on at least one side of the board;

a frame, in which said board is mounted, said frame having a bottom and side walls, said bottom having at least two lugs and said side walls having at least two resilient tongues, said lugs and tongues cooperating to define a space therebetween and to resiliently locate said board in said space retaining the board in a vertical direction, said walls including at least one tooth which is received into said at least one eyelet, said at least one tooth and said at least one eyelet retaining said board in a longitudinal direction, said frame including at least one outwardly extending pin; and at least one resilient ring bearing, mounted on said at least one outwardly extending pin and received into said at least one seat.

20. The resilient mount according to claim 19, wherein said board includes a hole therein and said frame including a stud extending through said hole, when said board is mounted on said frame, said board resiliently mounted to said stud by means of a screw having a screwhead larger than said hole said screw extending through said hole and threadably engaged into said stud.

21. The resilient mount according to claim 20, further including a washer interposed between said screwhead and said board.

22. The resilient mount according to claim 20, wherein said optical unit is mounted on one end of said board, said lugs and tongues are located on opposite sides of said board at about said one end of said board with said hole at the other end of said board, said at least one eyelet comprising at least two eyelets and said at least one tooth comprising at least two teeth in correspondence with said at least two eyelets, said eyelets located on opposite sides of said board near said lugs and tongues.

23. The resilient mount according to claim 22, wherein said at lest one outwardly extending pin comprises four outwardly extending pins, two pins located on each side, said at least one seat comprises four seats located in said casing at positions corresponding to the locations of said four pins, and said at least one at least one resilient ring bearing comprising four resilient ring bearings, one bearing located one a respective pin and supporting said respective pin in a respective one of said seats.

24. A resilient mount for locating a portable electro-optical device, including an optical unit and an electronic unit, in an external casing for containing said device, said external casing including four spaced apart seats, said resilient mount comprising:

a board upon which said units of said device are mounted, said board having ends separated by a longitudinal direction and two sides separated by a transverse direction, said optical unit is mounted on one end of said board, said board including two eyelets, one eyelet on each side of said board, said board includes a hole therein on the other end of said board;

a frame, in which said board is mounted, said frame having a bottom and two side walls, said bottom having at least two lugs and said side walls having at least two resilient tongues, said lugs and tongues are located on opposite sides of said board at about said one end of said board, said lugs and tongues cooperating to define a space therebetween and to resiliently locate said board in said space retaining the board in a vertical direction, each of said side walls including a tooth corresponding to and received into respective ones of said two eyelets, said teeth and eyelets retaining said board in a longitudinal direction, said frame including four outwardly extending pins, said frame including a stud extending through said hole in said board, when said board is mounted on said frame, said board is resiliently mounted to said stud by means of a screw having a screwhead, said screw extending through said hole and threadably engaged into said stud and a washer disposed between said screwhead and said stud; and four resilient ring bearing, one bearing mounted on each outwardly extending pin and received into said seats.

* * * * *